United States Patent [19]

Hauer

[11] Patent Number: 4,994,660
[45] Date of Patent: Feb. 19, 1991

[54] AXISYMMETRIC VECTORING EXHAUST NOZZLE

[75] Inventor: Thomas A. Hauer, Westchester, Ohio

[73] Assignee: General Electric Company, Cincinnati, Ohio

[21] Appl. No.: 336,369

[22] Filed: Apr. 11, 1989

[51] Int. Cl.$^5$ .............................. B64C 15/06
[52] U.S. Cl. ...................... 239/265.41; 239/265.19; 239/265.35; 239/265.39; 60/228; 60/230; 60/232; 244/23 D; 244/52
[58] Field of Search ............. 239/265.19, 265.33, 239/265.35, 265.37, 265.39, 265.41; 244/23 D, 110 B, 52; 60/227, 228, 230, 232, 271, 226.1

[56] References Cited

U.S. PATENT DOCUMENTS

| | | | |
|---|---|---|---|
| 2,794,317 | 6/1957 | Brown | 239/265.39 |
| 2,806,349 | 9/1957 | Yeager | 239/265.39 |
| 2,927,424 | 3/1960 | Hyde | 239/265.39 |
| 3,003,312 | 10/1961 | Jewell | 239/265.37 |
| 3,142,153 | 7/1964 | Hensley | 60/232 |
| 3,319,892 | 5/1967 | Zirin | 60/271 |
| 3,448,583 | 6/1969 | MaGuire | 60/271 |
| 4,128,208 | 12/1978 | Ryan et al. | 239/265.39 |
| 4,176,792 | 12/1979 | McCardle, Jr. | 239/265.41 |
| 4,219,156 | 8/1980 | Schwaerzler | 239/265.35 |
| 4,245,787 | 1/1981 | Freid | 239/265.41 |
| 4,363,445 | 12/1982 | Bouiller et al. | 239/265.35 |
| 4,456,178 | 6/1984 | Jones et al. | 239/265.39 |
| 4,508,270 | 4/1985 | Joubert | 239/265.35 |
| 4,575,006 | 3/1986 | Madden | 239/265.29 |

OTHER PUBLICATIONS

Popular Science, Feb., 1989, X-31 Fighter, Thrust Vectoring of Pitch and Yaw Plane by Deflection of Exhaust, X-31A Aircraft.
ISABE 87-7061, "Thrust Vectoring-Why and How?", Dr. W. B. Herbst, Thrust Vectoring of Pitch and Yaw Plane by Deflection of Exhaust, X-31A Aircraft.

Primary Examiner—Andres Kashnikow
Assistant Examiner—Christopher G. Trainor
Attorney, Agent, or Firm—Jerome C. Squillaro

[57] ABSTRACT

A thrust vectoring axisymmetric convergent divergent variable exhaust nozzle is provided with a universally pivoting joint between the divergent and convergent flaps and actuating the linkage mechanisms for changing the divergent nozzle section from axisymmetrical to asymmetrical by pivoting the divergent flaps in the radial and tangential directions with respect to the axisymmetric nozzle centerline in a controlled manner.

34 Claims, 7 Drawing Sheets

AXISYMMETRIC VECTORING EXHAUST NOZZLE

BACKGROUND OF THE INVENTION

1. Field of the Invention

This invention relates generally to vectorable nozzles and, more particularly, to vectorable axisymmetric variable exhaust nozzles for gas turbine engines.

2. Description of the Prior Art

For military aircraft applications, there exists a need to increase the maneuverability of the aircraft both for air to air combat missions and complicated ground attack missions. Conventionally aerodynamic surfaces such as flaps and aerilons have traditionally been used to effect maneuvers of the aircraft but, depending on the speed and other operating conditions, have limited effectiveness. Modern day aircraft designers are turning to vectorable nozzles which turn or vector the exhaust flow and thrust of the gas turbine engine powering the aircraft. Two dimensional nozzles have been devised which employ relatively flat flaps to direct the pitch or yaw direction of the engine's thrust. However these designs are heavy and require a conversion section to change the axisymmetric flow to a two dimensional flow and still only provides thrust vectoring in one plane, pitch or yaw. Another drawback to the two dimensional nozzle are the flow losses due to the conversion from axisymmetric to 2D flow within the conversion section. In addition to providing thrust vectoring, aircraft engine designers must also allow for nozzle operating conditions which vary significantly during the mission. In order to maintain high performance over the entire operating range of the aircraft, variable exhaust nozzles have been designed which control the opening of the nozzle throat but vectorable nozzles having two dimensional and gimbaling configurations result in increased complexity, weight, cost, and reliability penalties.

Most current multimission aircraft applications employ engines, such as the General Electric F110 engine, with axisymmetric convergent-divergent nozzles to meet operational requirements. Axisymmetric convergent/divergent nozzles have, in serial flow relationship, a convergent section, a throat, and a divergent section. Convergent or primary flaps and divergent or secondary flaps together with associated seals between the flaps define the flow path of their respective sections. Characteristically, these nozzles employ variable area means at both the nozzle throat (at the downstream end of the convergent nozzle) and at the nozzle exit (at the downstream end of the divergent flap). This provides a means to maintain a desired exit to throat area ratio which in turn allows efficient control over the operation of the nozzle. The operation of the nozzle is designed to provide a nozzle throat/exit area ratio schedule which is optimized for the design cycle of the engine and should provide efficient control at both low subsonic and high supersonic flight conditions. These types of nozzles employ circumferentially disposed flaps to produce a generally axisymmetric exhaust flow and use pneumatic or hydraulic actuators to provide the variable operation.

It is therefore highly desirable and an object of the present invention to provide an axisymmetric nozzle vectoring system that can be easily adapted to an existing nozzle design or configuration.

Another object of the present invention is the provision for an axisymmetric variable area exhaust nozzle having thrust vectoring capability in both the pitch and yaw direction.

Yet another object of the present invention to provide an axisymmetric variable area exhaust nozzle having multi-directional thrust vectoring capability which is simple in operation, light in weight, and economical to manufacture.

These objects and other features and advantages will become more readily apparent in the following description when taken in conjunction with the appended drawings.

SUMMARY OF THE INVENTION

Briefly, in accordance with one aspect of the present invention, a means for vectoring the thrust of an axisymmetric convergent/divergent nozzle having a plurality of divergent flaps comprises a means to universally pivot the flaps in an asymmetric fashion.

A more particular embodiment of the present invention provides a means to pivot the divergent flaps in radial and tangential directions with respect to the unvectored nozzle centerline.

A more particular embodiment of the present invention provides an axisymmetric convergent/divergent nozzle including means for vectoring the thrust in the pitch and yaw direction comprises a plurality of convergent and divergent flaps connected together by spherical joints having seals disposed circumferentially between the flaps to form a vectorable nozzle having a variable area throat and exit which further allows a throat/exit area ratio schedule which may be substantially optimized for the engine's operation. Thrust vectoring means includes the spherical joint between the primary and secondary flaps and an actuation means to pivot the secondary flaps in a coordinated manner. The spherical joint between the primary and secondary flaps and a secondary actuation means provides a means to universally pivot each secondary flap through a different angle so as to provide a coning motion to the secondary flap with respect to the primary flap. A more particular embodiment of the invention provides for an actuation means to pivot the secondary flaps in a predetermined or scheduled manner so as to vector the exhaust flow in both the pitch and yaw directions while maintaining the integrity of the flow and minimizing turning losses and leakage.

Another embodiment of the invention provides the secondary actuation means, used to pivot the secondary flap with an actuation ring surrounding the secondary flaps and linkage bars connecting the aft end of the secondary flaps to the actuation ring and the connection provided by means of a spherical bearing or spherical joint. The actuation ring is controlled by at least three, preferably hydraulic, linear actuators evenly spaced around the engine and connecting the actuation ring to the engine casing by the use of spherical or spherical joints between the engine casing and the forward end of the actuator as well as between the aft end of the actuator and the actuation ring. Vectoring of the exhaust flow or thrust is accomplished by extending or retracting the linear actuators unequally thereby translating and tilting the actuation ring to a desired attitude with respect to the engine centerline which in turn rotates or pivots each of the divergent flaps through a set of angles in two perpendicular planes thereby providing the angled flow path of the exhaust with respect to the engine centerline in a controlled manner. Pivoting of the convergent flaps to control the throat area of the nozzle by way of a cam and roller mechanism is known in the art, as is pivoting of the divergent flaps to control nozzle exit area, and means of controlling the seals between the flaps or the interflap seals to provide a continuous circumferential nozzle surface. These designs and methods are depicted in U.S. Pat. Nos. 4176792, 4245787, and 4,128,208 entitled "Variable Area Exhaust Nozzle", Arthur McCardle, Jr., "Variable Area Nozzle System", Wilbert B. Freid, "Exhaust Nozzle Flap Seal Arrangement", Edward W. Ryan, et al, assigned to the same assignee and incorporated herein by reference.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
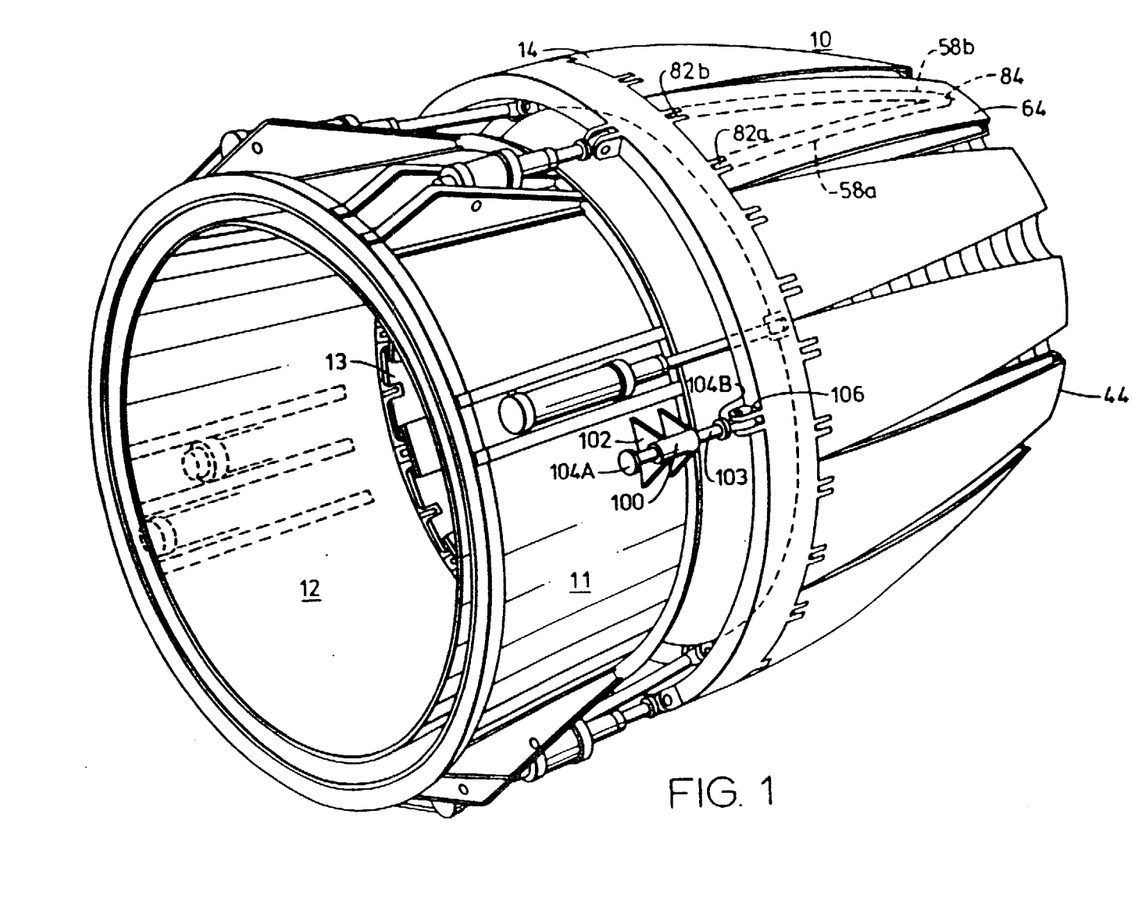
FIG. 1 is a perspective view of a gas turbine engine axisymmetric variable exhaust nozzle with thrust vectoring means in accordance with the present.
Figure 2:
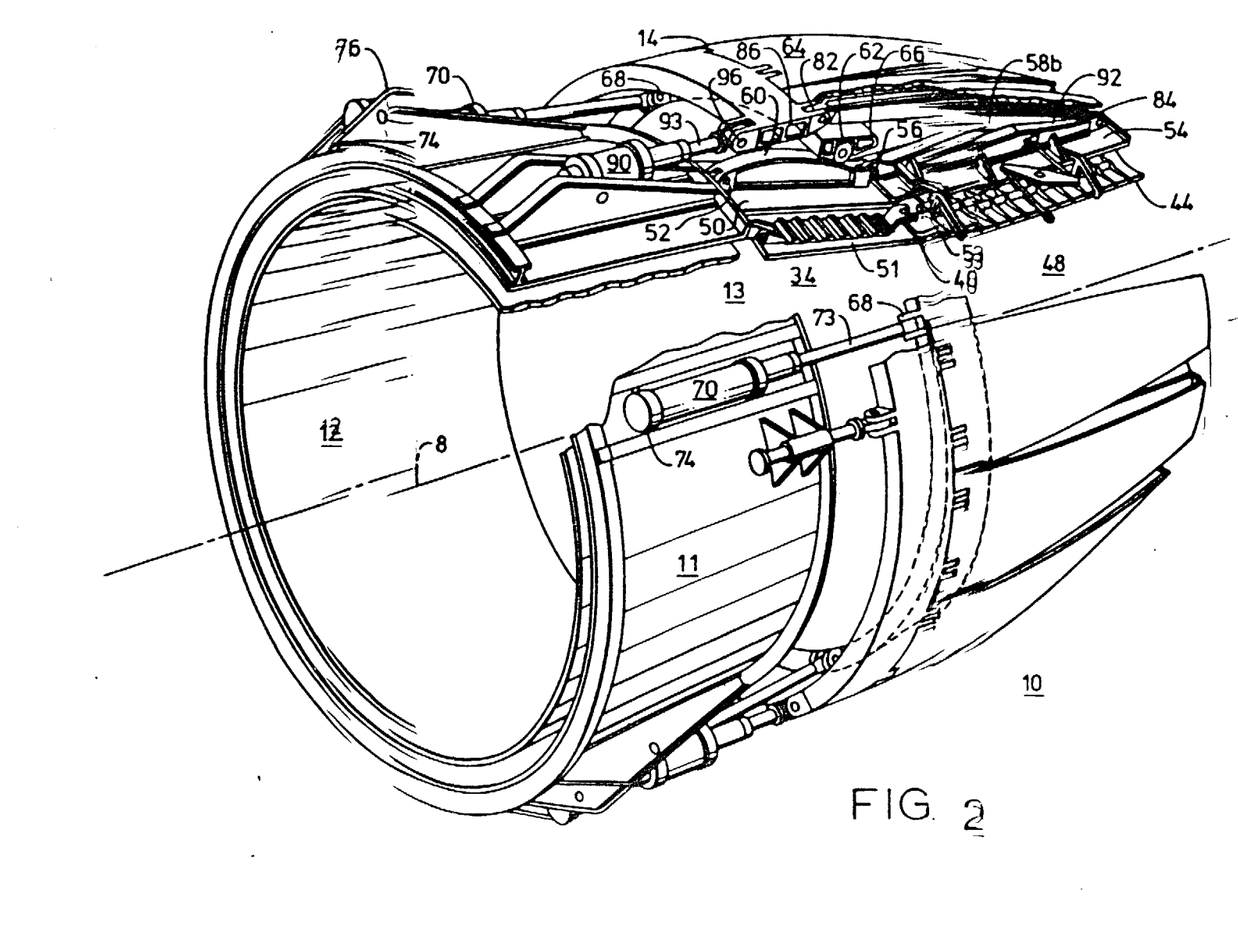
FIG. 2 is a partial cutaway of the nozzle shown in FIG. 1.

Referring now to FIGS. 1 and 2, the present invention is shown generally in the exhaust section 10 of a gas turbine engine comprising in serial flow relationship a fixed area duct 11, including an afterburner liner 12, and a variable area downstream section 13 having an axisymmetric nozzle 14 of the convergent divergent type. Although the nozzle as shown is of the convergent-divergent type wherein the downstream section 13 includes both a convergent section and a divergent section as will be discussed hereinafter, the present invention is not intended to be limited to such a structure.

Referring now to FIG. 2, nozzle 14 comprises in serial flow relationship a convergent section 34, a throat 40 and a divergent section 48. The convergent section 34 includes a plurality of convergent or primary flaps 50 circumferentially disposed about engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. Divergent or secondary flap 54 is pivotally attached to the aft end of primary flap 50 at its forward end 51 by a first universal or spherical joint means 56 generally at an axial position in the nozzle 14 which which coincides with throat 40. Secondary flaps 54 are generally circumferentially disposed about engine centerline 8 with overlapping divergent or secondary seals 55 disposed between and in sealing engagement with the radially inward facing surface of circumferentially adjacent secondary flaps 54. For an understanding of the secondary seal and how it operates reference may be made to the patent application Ser. No. 336,380, entitled "Axisymmetric Vectoring Exhaust Nozzle Seal", William C. Lippmeier, filed with present application and assigned to the same assignee. Throat 40 has associated with it a throat area conventionally denoted as A8 and the nozzle exit 44 is generally at the end of secondary flaps 54 and has an exit area associated with it conventionally denoted as A9. More detailed methods of mounting flaps and seals are shown in the patents referenced earlier.

A plurality of rollers 62 are disposed in a primary ring structure 66 which in turn is translated forward and aft by a plurality of primary actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and secondary flaps 54 radially outward thus keeping cam 60 in contact with cam roller 62. Primary actuator 70 is pivotally connected to engine casing 11 by a support 76 with a pin joint 74. Primary actuator 70 has an actuator rod 73 which in turn is connected to primary ring structure 66 by a spherical joint 68.

A plurality of secondary actuators 90, of which there are three in the preferred embodiment, are mounted at different circumferential locations around case 11 than primary actuators 70 and in the same manner as actuator 70. A secondary actuation ring 86 is connected to secondary actuators 90 at the aft end of a secondary actuator rod 93 by a spherical joint 96. This provides secondary actuating ring 86 to be axially located and tilted about centerline 8 in order to control its attitude. Actuating ring 86 controls the positioning or pivoting of secondary flaps 54. Secondary flap 54 is pivotally connected to primary flap 50 by a spherical joint 56 and is pivotally controlled in a multi-degree of freedom manner by by control arms 58a and 58b (as shown in FIG. 1) which operably connect secondary actuating ring 86 to secondary flap 54. Arms 58 are connected to secondary ring 86 by clevis pin joints 82 and to the aft end of secondary flap 54 by a spherical joint 84. Backbone 92 provides a mount for secondary flap 54 and support for the joints at either end. Arms 58a and 58b are thereby pinned at the forward end to secondary actuating ring 86 and at their aft end universally joined to the aft end of secondary flap 54 thereby translating an attitude change of secondary ring 86 into a multi degree of freedom pivoting change or orbital movement of secondary flap 54 and each flap is pivoted through a different angle. Translation of the secondary ring opens and closes the nozzle exit 44 thereby providing control of nozzle exit area A9. Outer flap 64 is attached to arms 58 and helps provide a clean and smooth aerodynamic shape for the exterior the nozzle.

Figure 3:
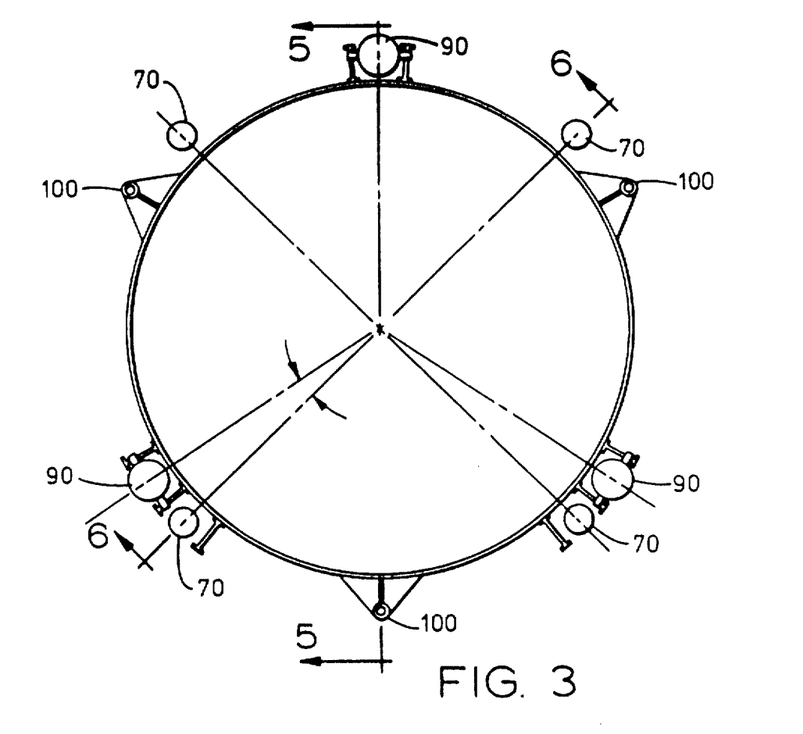
FIG. 3 is a cross sectional forward looking aft view of the nozzle casing and external mounting hardware and actuator locations.
Figure 4:
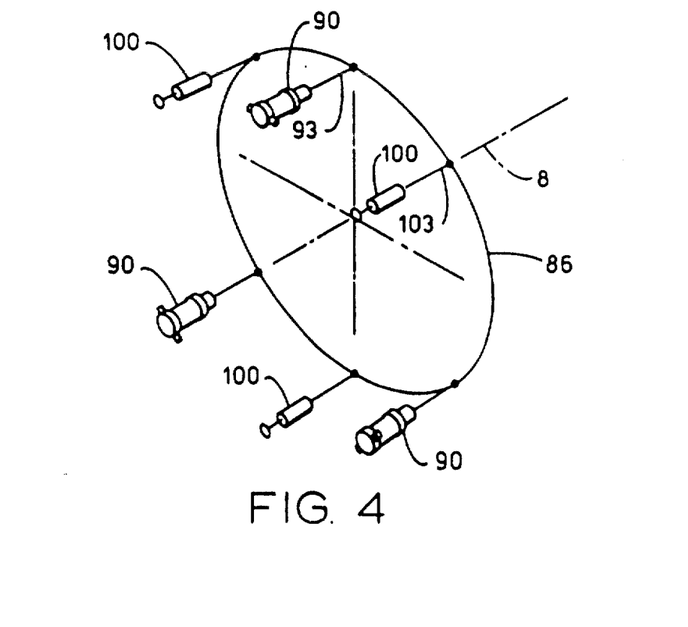
FIG. 4 is a diagram of the secondary flap actuating and support system.
Figure 5:
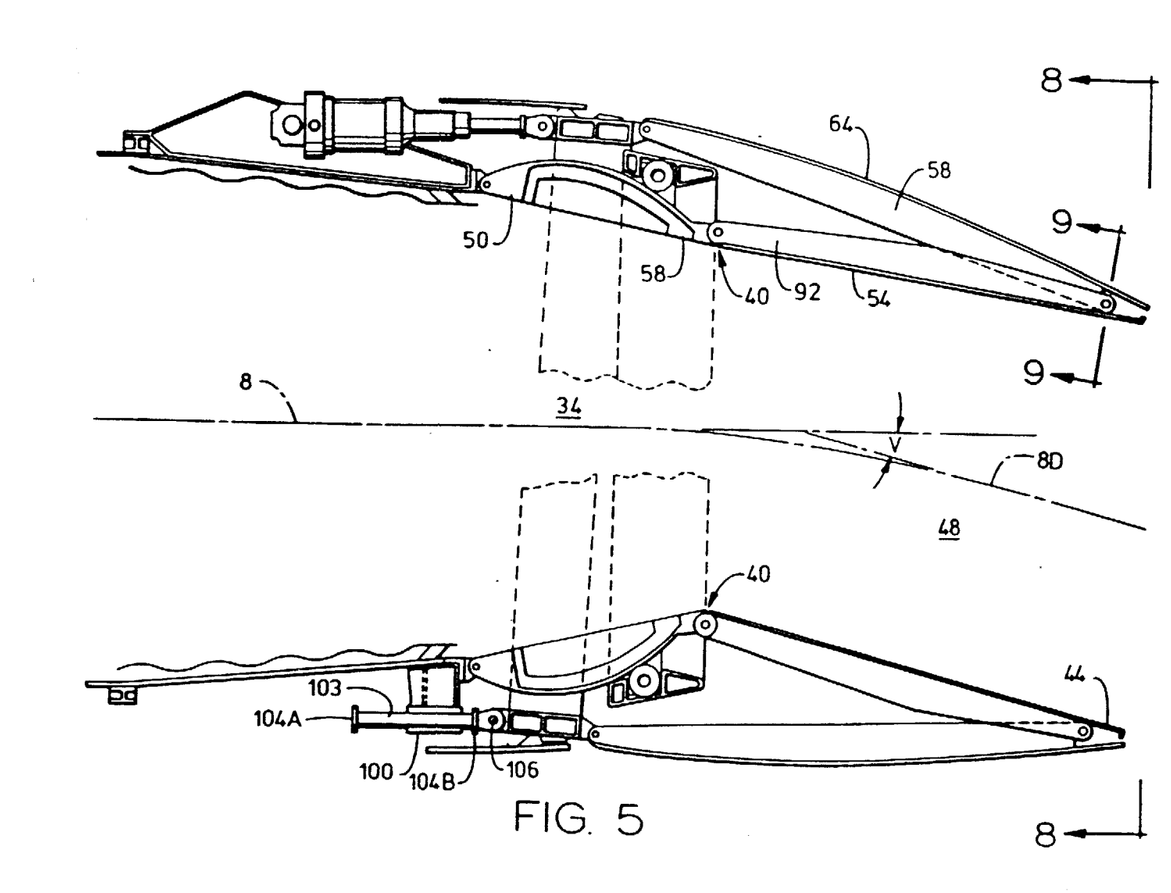
FIG. 5 is a cross-sectional view of the exhaust nozzle at an exemplary vectoring angle taken in a plane which passes through the middle of the divergent flaps as at (12 O'clock) in accordance with one embodiment of the invention.

Secondary actuating ring support 100 is fixedly mounted to case 11 by brackets 102 and is, in this embodiment, a hollow tube with a support rod 103 slideably contained within. Support rod 103 is universally joined to secondary actuating ring 86 by spherical joint 106 thereby providing radial positioning and support of secondary actuating ring 86. The circumferential locations of the actuators and supports are shown in FIG. 3 in order to give a frame of reference for describing the invention. FIG. 3 is a schematic view forward looking aft and for reference purposes secondary actuator is at 12 O'clock and support 100 is at 6 O'clock. FIG. 4 schematically shows how the three secondary actuators control actuating ring 86 by translating their respective rods 93 in a coordinated fashion to tilt the ring about axis 8 for effecting thrust vectoring and to translate the ring forward and aft to set the exhaust area A9. The support rods and the rest of the system limit the amount of tilt available to the thrust vectoring system. By selectively designing enough slack or "slop" into the system the amount of tilt can be increased or decreased as desired. FIG. 5 depicts how the secondary actuating ring 86 can be tilted thereby pivoting the secondary flaps 54 to produce thrust vectoring. Also depicted are the primary actuating ring 66, cam surface 60 and cam roller 62 used to vary the throat area by pivoting primary flaps 50. The lower half of FIG. 5 shows how support rod 103 is attached to secondary actuating ring 86 in such a manner as to provide radial support of the ring and allow the ring to be tilted by the use of spherical joint 106. Rod stops 104a and 104b prevent the rod from becoming dislodged from support 100. Spherical joint 106 is limited as to the amount of orbital movement, pivoting or rotation it will permit the ring to be subject to. The amount is left up to the designer and depends on the strength capabilities and the vectoring requirements of the nozzle.

Effective vectoring can be provided wherein the secondary flap 54 requires about plus and minus thirteen degrees ($\pm 13°$) of pivoting in the radial direction for a given A8 setting and about plus and minus six degrees ($\pm 6°$) of pivoting in the tangential direction. The radial direction is taken with respect to the unvectored nozzle centerline 8 and the tangential direction is taken with respect to the radial direction as depicted by R and T in FIG. 7. The requirements due to adjusting the A8 and A9 settings bring the radial pivoting requirements to about plus fifty and minus 13 degrees ($+50° -13°$). Therefore the joints need not be completely universal or may have stops that are incorporated to judiciously limit the amount of pivoting in a given direction. The amount of orbital pivoting or rotation required by the other joints in the actuation system and linkage can be calculated. A typical universal joint such as spherical joint 84 in FIG. 2 is shown in more detail in FIG. 9. having a race 222 and a truncated spherical ball 220 therein. The aft end of arms 58 have apertures thereby forming prongs 225 and 227 to join secondary flap 54 to control arms 58. Bolt 230 passes through the apertures of prongs 225 and 227 and the hole in ball 220 and the entire assembly is held together by nut 250 and washer 251. During operation this type of universal joint provides limited three degree of freedom of rotation for the secondary flaps, seals, and actuating and connecting members to which they are attached. Clevis hinges or pin joints, as exemplified by clevis joint 52 in FIG. 2 provide a single degree of freedom of rotation about the hinge or pin centerline.

Figure 6:
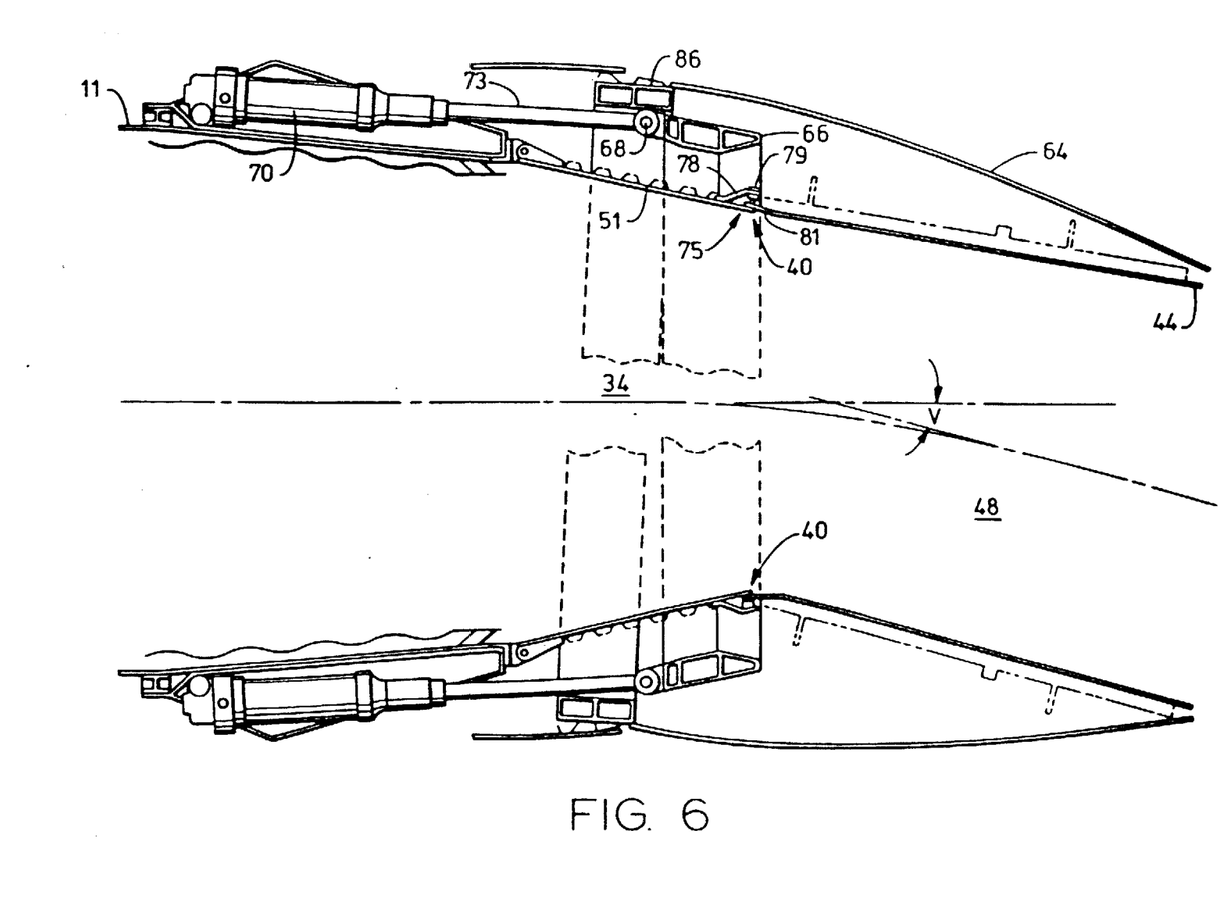
FIG. 6 is a cross-sectional view of the exhaust nozzle at another exemplary vectoring angle taken in a plane which passes through the middle of the divergent seals as at (12:30 O'clock) in accordance with one embodiment of the invention.

FIG. 6 shows in greater detail th relative spacing and arrangement of the primary actuating ring 66 and its relationship to the secondary actuating ring 86. Also depicted are primary seal 51 and secondary seal 55, and seal joint 75 for which reference is now made to FIG. 1. Seal joint 75 includes a forked prong 78 on the aft end of primary seal 51 engaging within its slot a pin 79 attached to the forward end of secondary seal 55 thereby trapping the secondary seal between the aft end of the primary seal and the forked prong which in turn restrains movement of secondary seal relative to the primary seal in the radial and circumferential directions.

In operation thrust vectoring is accomplished by pivoting the divergent nozzle flaps 54 in an asymmetric fashion with respect to nozzle centerline 8. Pivoting is done in both the radial direction with respect to the centerline and in a direction tangential to a circumference about the centerline. The pivoting is asymmetric because at least two of the flaps which are pivoted, are rotated through different angles. Though some of these angles may be equal in magnitude they are different in sign, ie $\pm 3°$.

Figure 9:
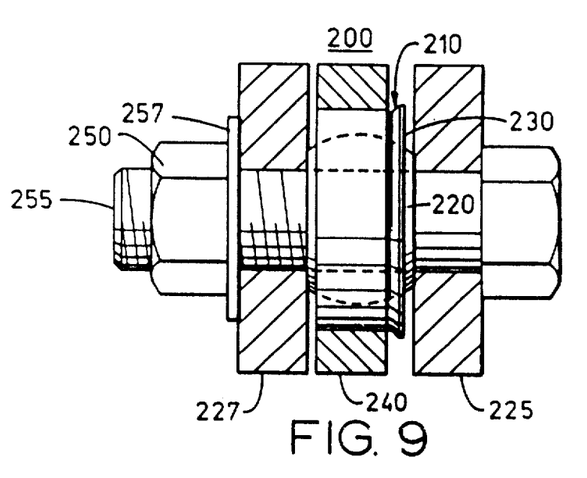
FIG. 9 is a cross-sectional view of a universal joint of the type that can be used in accordance with the present invention.

One feature employed through various elements of the invention is a universal or spherical joint, an example of which is shown in FIG. 9. This type of joint allows universal pivoting or rotation about three axis. Reference is now made to FIG. 9 which shows three axis having their intersection or origin at the center of ball 220 and conventionally defined as x, y and z. As can be readily seen the amount of rotation is greatly limited but not much is needed to effectively vector the thrust in a useful manner.

Figure 7:
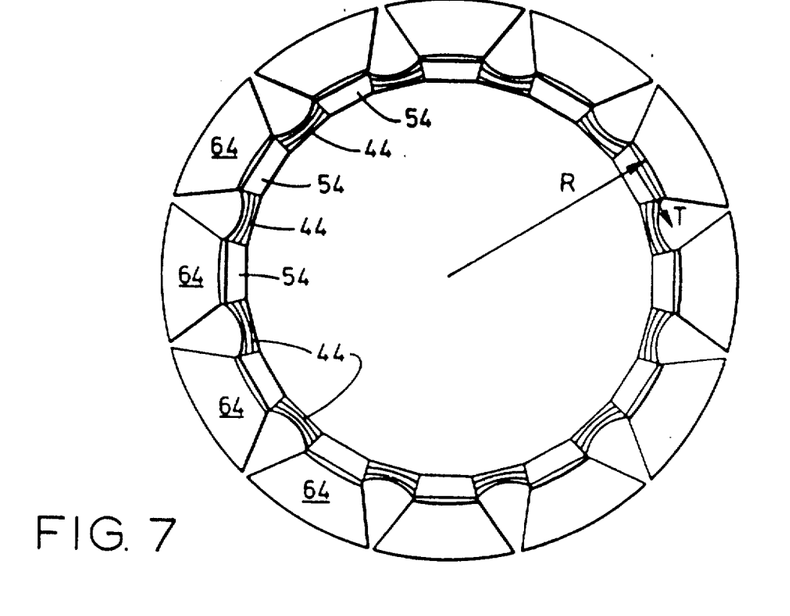
FIG. 7 is an aft looking forward view of the nozzle in FIG. 1 showing the exhaust nozzle at 0 degrees of deflection or vectoring angle.
Figure 8:
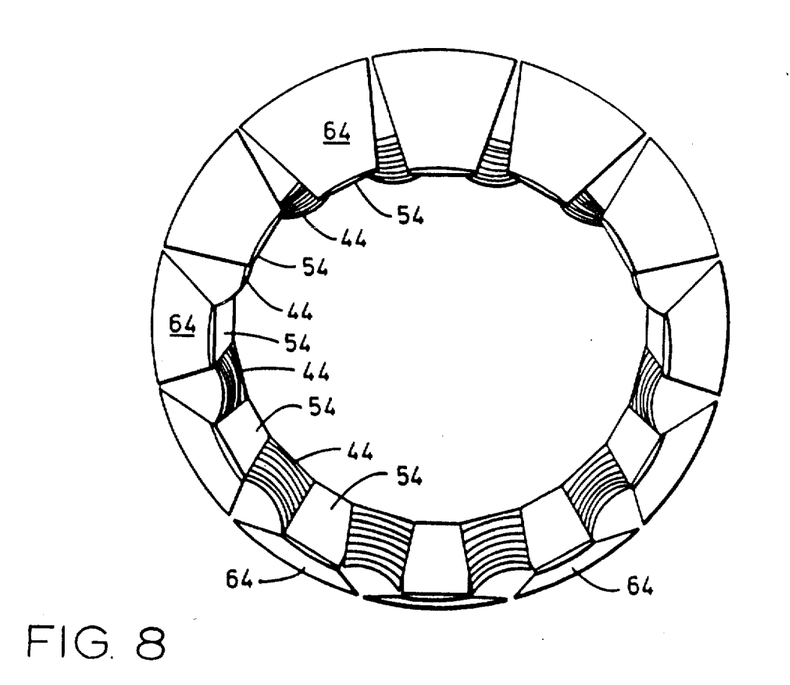
FIG. 8 is an aft looking forward view of the nozzle in FIG. 1 showing the exhaust nozzle at an exemplary negative degrees of deflection or vectoring angle.

Actuation of the pivotal divergent flaps 54 is accomplished by having the three secondary actuators 90 extend or retract out their respective rods 93 different amounts thereby tilting the secondary actuating ring 86. This action in turn causes at least two of the twelve divergent flaps to pivot in an asymmetric manner changing the axisymmetric divergent section into a asymmetric flow path. In the preferred embodiment, shown in FIGS. 7 and 8, the axisymmetric positions of divergent flaps 1F through 12F in FIG. 7 are changed as depicted in as opposed to their positions when the divergent section is FIG. 8 when they are all tilted down in an asymmetric manner such that flap 1F is tilted radially inward towards centerline 8 and flap 7F is tilted away from centerline 8. This motion causes the divergent section of the nozzle to change its axisymmetric cross section into an asymmetric cross section such as the one shown in FIGS. 5 and 6 as the axisymmetric divergent nozzle section is changed to an asymmetric one. The asymmetry in the divergent nozzle section can be oriented over a wide range of angles about the symmetric centerline 8 though I have found that $\pm 13°$ to be a preferred range. The degree of asymmetry can be defined as the angle between the centerline 8 and the divergent section centerline 8D of the divergent nozzle section. Spherically rotating the secondary actuating ring or tilting the ring such that its axis moves in a coning sort of fashion pivots the divergent section centerline in a coning motion which vectors the thrust completely or 360° about the engine centerline 8 up to some predetermined vectoring angle V.

Having thus described what is considered novel and desired to be secured by Letters Patent of the United States is I claim:

1. A means for vectoring the thrust of an axisymmetric convergent/divergent nozzle comprising:
a divergent nozzle section having a longitudinal axis, said divergent nozzle section comprising a plurality of divergent flaps and a means for changing said divergent nozzle section from axisymmetrical about said longitudinal axis to asymmetrical.

2. A means for vectoring the thrust of an axisymmetric convergent/divergent nozzle as in claim 1 wherein said means for changing said divergent nozzle section from axisymmetrical to symmetrical to comprises a means for universally pivoting said divergent flaps.

3. A means for vectoring the thrust of an axisymmetric convergent/divergent nozzle as in claim 2 wherein said means for universally pivoting said divergent flaps comprises a universal joint connecting said divergent flap to a convergent section of the nozzle.

4. A means for vectoring the thrust of an axisymmetric convergent/divergent nozzle as in claim 3 wherein said means for universally pivoting said divergent flaps further comprises an actuating means for universally pivoting at least one of said divergent flaps.

5. A means for vectoring the thrust of an axisymmetric convergent/divergent nozzle as in claim 3 wherein said means for universally pivoting said divergent flaps further comprises an actuating means for universally pivoting said plurality of divergent flaps.

6. A means for vectoring the thrust of an axisymmetric convergent/divergent nozzle as in claim 5 wherein said actuating means comprises an actuating ring spaced radially outward of nozzle throat and a divergent flap linkage including actuating arms which operably connect said actuating ring to an aft end of said divergent flap.

7. A means for vectoring the thrust of an axisymmetric convergent/divergent nozzle as in claim 6 wherein said actuating arms are operably connected to said actuating ring with a pin joint and to the aft end of said divergent flap with a universal joint.

8. A means for vectoring the thrust of an axisymmetric convergent/divergent nozzle as in claim 7 wherein said pin joint is a clevis type hinge joint and said universal joint is a spherical joint.

9. A means for vectoring the thrust of an axisymmetric convergent/divergent nozzle as in claim 6 wherein said actuating means further comprises a means for tilting said actuating ring.

10. A means for vectoring the thrust of an axisymmetric convergent/divergent nozzle as in claim wherein said actuating means further comprises a means for axially translating said actuating ring.

11. A means for vectoring the thrust of an axisymmetric convergent/divergent nozzle as in claim wherein said means for tilting said actuating ring and said means for axially translating said actuating ring comprises a plurality of linear actuators fixed relative to the nozzle casing and operably connected to said actuating ring.

12. A means for vectoring the thrust of an axisymmetric convergent/divergent nozzle as in claim 11 wherein said linear actuators are operably connected to said actuating ring by a universal joint.

13. A means for vectoring the thrust of an axisymmetric convergent/divergent nozzle as in claim 12 wherein said universal joint is a spherical bearing.

14. A means for vectoring the thrust of an axisymmetric convergent/divergent nozzle as in claim 13 having three linear actuators.

15. A means for vectoring the thrust of an axisymmetric convergent/divergent nozzle as in claim 14 wherein said joints connecting said linear actuators to said actuating ring are evenly spaced about said ring.

16. A means for vectoring the thrust of an axisymmetric convergent/divergent nozzle as in claim 15 wherein said linear actuators are independently controllable.

17. A vectorable axisymmetric convergent/divergent nozzle comprising:
in serial flow relationship and defining a flow path;
a fixed nozzle casing,
a convergent nozzle section,
a throat, and
a divergent nozzle section having a longitudinal axis wherein said divergent nozzle section comprises a plurality of divergent flaps and a divergent flap control means for changing the flow path in said divergent nozzle section from axisymmetrical about said longitudinal axis to asymmetrical.

18. A vectorable axisymmetric convergent/divergent nozzle as in claim 17 wherein said divergent flap control means comprises a means for universally pivoting said divergent flaps.

19. A vectorable axisymmetric convergent/divergent nozzle as in claim 18 wherein means for universally pivoting said divergent flaps comprises a universal joint connecting said divergent flap to the convergent section of the nozzle.

20. A vectorable axisymmetric convergent/divergent nozzle as in claim 19 wherein said means for universally pivoting said divergent flaps further comprises an actuating means for universally pivoting said plurality of divergent flaps.

21. A vectorable axisymmetric convergent/divergent nozzle as in claim 20 wherein said actuating means comprises an actuating ring spaced radially outward of the nozzle's throat and a divergent flap linkage including actuating arms which operably connect said actuating ring to the aft end of said divergent flap.

22. A vectorable axisymmetric convergent/divergent nozzle as in claim 21 wherein said actuating arms are operably connected to said actuating ring with a pin joint and to the aft end of said divergent flap with a universal joint.

23. A vectorable axisymmetric convergent/divergent nozzle as in claim 22 wherein said pin joint is a clevis hinge joint and said universal joint is a spherical joint.

24. A vectorable axisymmetric convergent/divergent nozzle as in claim 21 wherein said actuating means further comprises a means for tilting said actuating ring.

25. A vectorable axisymmetric convergent/divergent nozzle as in claim 24 wherein said actuating means further comprises a means for axially translating said actuating ring.

26. A vectorable axisymmetric convergent/divergent nozzle as in claim 25 wherein said means for tilting said actuating ring and said means for axially translating said actuating ring comprises a plurality of linear actuators fixed relative to the nozzle casing and operably connected to said actuating ring.

27. A vectorable axisymmetric convergent/divergent nozzle as in claim 26 wherein said linear actuators are operably connected to said actuating ring by a universal joint.

28. A vectorable axisymmetric convergent/divergent nozzle as in claim 27 wherein said universal joint is a spherical joint.

29. A vectorable axisymmetric convergent/divergent nozzle as in claim 28 wherein said means for axially translating said actuating ring comprises three linear actuators.

30. A vectorable axisymmetric convergent/divergent nozzle as in claim 29 wherein said joints connecting said linear actuators to said actuating ring are evenly spaced about said ring.

31. A vectorable axisymmetric convergent/divergent nozzle as in claim 30 wherein said linear actuators are independently controllable.

32. A vectorable axisymmetric convergent/divergent nozzle as in claim 29 wherein said throat is a variable area throat.

33. A vectorable axisymmetric convergent/divergent nozzle as in claim 17 wherein said divergent flap control means comprises a means for pivoting said divergent flaps in the radial and tangential directions with respect to the unvectored nozzle centerline.

34. A vectorable axisymmetric convergent/divergent nozzle as in claim 33 wherein means for pivoting said divergent flaps comprises a universal joint connecting said divergent flap to the convergent section of the nozzle.

* * * * *